United States Patent
Suarez et al.

(10) Patent No.: US 9,535,754 B1
(45) Date of Patent: Jan. 3, 2017

(54) DYNAMIC PROVISIONING OF COMPUTING RESOURCES

(71) Applicant: Amazon Technologies, Inc., Seattle, WA (US)

(72) Inventors: Anthony Joseph Suarez, Seattle, WA (US); Jason Roy Rupard, Renton, WA (US); Eden Grail Adogla, Seattle, WA (US); Michael Francis Quigley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/615,135

(22) Filed: Feb. 5, 2015

(51) Int. Cl.
G06F 9/46 (2006.01)
G06F 9/50 (2006.01)
G06F 9/48 (2006.01)

(52) U.S. Cl.
CPC .......... *G06F 9/5011* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 7,213,065 B2 | 5/2007 | Watt | |
| 7,765,299 B2 | 7/2010 | Romero | |
| 7,836,458 B1 * | 11/2010 | Gwozdz | H04L 29/06 709/221 |
| 7,945,751 B2 | 5/2011 | Garapati et al. | |
| 8,185,624 B2 | 5/2012 | Pal et al. | |
| 8,261,295 B1 * | 9/2012 | Risbood | G06F 8/61 717/177 |
| 8,346,935 B2 | 1/2013 | Mayo et al. | |
| 8,612,393 B2 | 12/2013 | Huang et al. | |
| 2002/0120868 A1 | 8/2002 | Hay | |
| 2003/0074430 A1 | 4/2003 | Gieseke et al. | |
| 2007/0233717 A1 * | 10/2007 | Prabhakar | G06F 8/61 |
| 2007/0294309 A1 | 12/2007 | Shwartz et al. | |
| 2009/0037875 A1 * | 2/2009 | Jones | G06F 8/34 717/109 |
| 2011/0131557 A1 * | 6/2011 | Bouillet | G06F 9/541 717/138 |
| 2011/0153684 A1 * | 6/2011 | Yung | G06F 9/45533 707/805 |
| 2011/0265087 A1 * | 10/2011 | Chen | G06F 11/3006 718/102 |
| 2014/0096127 A1 * | 4/2014 | Kimmet | G06F 9/5011 717/176 |

* cited by examiner

*Primary Examiner* — Diem Cao
(74) *Attorney, Agent, or Firm* — Robert C. Kowert; Meyertons, Hood, Kivlin, Kowert & Goetzel, P.C.

(57) ABSTRACT

Dynamic provisioning of computing resources may be implemented to provision computing resources for a data center or other collection of computing resources. Computing resources for provisioning may be detected. A build manifest describing configuration operations to provision the computing resources to perform respective tasks may be identified. The build manifest may be evaluated to direct the computing resources to perform the configuration operations according to the build manifest. In some embodiments, the provisioning of the computing resources may be paused or undone according to the build manifest. Upon completion of the configuration operations, the computing resources may be made available to perform the respective tasks.

20 Claims, 11 Drawing Sheets

DYNAMIC PROVISIONING OF COMPUTING RESOURCES

BACKGROUND

Data centers, and other collections of computers that undergird many different systems, services, or applications are growing in number and complexity. In order to keep up with increased demand for these services, additional resources may need to be integrated into new or existing infrastructures in order to begin providing extra capacity for performing different tasks. Provisioning computing resources to add capacity to these services has grown increasingly challenging. Large numbers of computers, servers, and other equipment are networked together creating a complex environment into which new resources are introduced. While some automated provisioning techniques have been achieved to increase the speed at which new resources may be added, constant changes to this environment make it increasingly difficult to adapt automated provisioning techniques to new circumstances.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement dynamic provisioning of computing resources. Provisioning computing resources to operate within new and existing infrastructures is challenging. Multiple different steps may be performed to configure computing resources, such as a server, to perform particular tasks or functions. Attempts to automate provisioning processes have created provisioning techniques that relay heavily upon decentralized logic, which attempts to try to determine the correct way to build a system based on a large number of variables. Such evaluations may be performed multiple times, creating the potential for error and wasted resources. Moreover, these automation techniques rely upon preconfigured applications, such as ram disks, to configure different computing resources. In order to differently provision a computing resource, one or multiple new ram disks may have to be created.

Dynamic provisioning of computing resources may allow for centralized control for provisioning computing resources. Build manifests may be centrally created, stored, and managed to provide simple provisioning workflows to provision computing resources for many different configurations. Build manifests may provide descriptions of configuration operations and decision making to perform the configuration operations so that decision-making is consistent, instead of on-the-fly. Provisioning computing resources according to a build manifest allows provisioning of computing resources to succeed, or fail, quickly and reliably.

Figure 1:
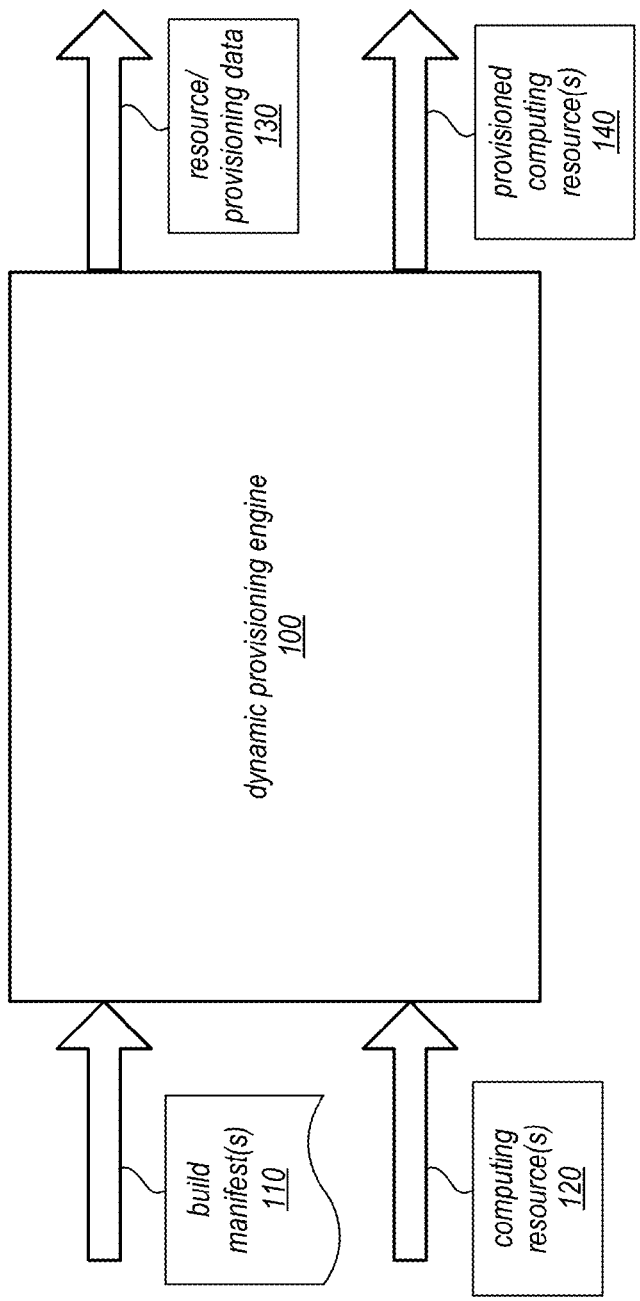
FIG. 1 is a logical diagram implementing dynamic provisioning of computing resources, according to some embodiments.

FIG. 1 is a logical diagram implementing dynamic provisioning of computing resources, according to some embodiments. Dynamic provisioning engine 100 receives, generates, and manages build manifest(s) 110. Build manifest(s) may describe one or more configuration operations to provision a computing resource to perform respective task(s). Different build manifest(s) 110 may be maintained to provision resources differently. For example, some computing resources may be suited for storage workloads, while other computing resources may be equipped to handle heavy processing workloads. Moreover, build manifest(s) 110 allow dynamic provisioning engine 100 to drive the provisioning of a particular computing resource in a centralized manner.

For example, as computing resource(s) 120 available for provisioning are detected, dynamic provisioning engine 100 may identify a build manifest for the computing resource(s). Various selection criteria, for instance, may be evaluated to select a build manifest that is compatible or best suited to the detected computing resources. Dynamic provisioning engine 100 may then evaluate the identified build manifest to direct the performance of configuration operations at the computing resource. In this way, configuration decision making may be moved from the computing resource itself to the dynamic provisioning engine 100. For instance, a build agent may be launched on raw computing resources. The build agent may implement a manifest framework that may perform configuration operations as described in the build manifest. Dynamic provisioning engine 100 may programmatically instruct the build agent to perform the configuration operations via the manifest framework in order to direct the performance of the configuration operations to configure the computing resource as described in the build manifest.

Dynamic provisioning engine 100 may direct the provisioning process to provide provisioned computing resource(s) 140 ready to perform work. Additionally, the build agent and dynamic provisioning engine may collect diagnostic information about the performance of the computing resource and the provisioning process, which may be later provided 130 to interested parties, and for further analysis. Dynamic provisioning engine 100 may be able to implement centralized control of the provisioning of larger numbers of computing resources being provisioned. Moreover, as dynamic provisioning engine 100 directs the performance of the configuration operations, provisioning operations may be paused, or undone in order to handle different failure scenarios that occur within the provisioning process which may be resolved more efficiently by dynamic provisioning engine 100.

This specification next includes a general description of a provider network, which may implement dynamic provisioning of computing resources. Then various examples of a provider network and dynamic provisioning service are discussed, including different components/modules, or arrangements of components/module that may be employed as part of implementing a dynamic provisioning service. A number of different methods and techniques to dynamic provisioning of computing resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
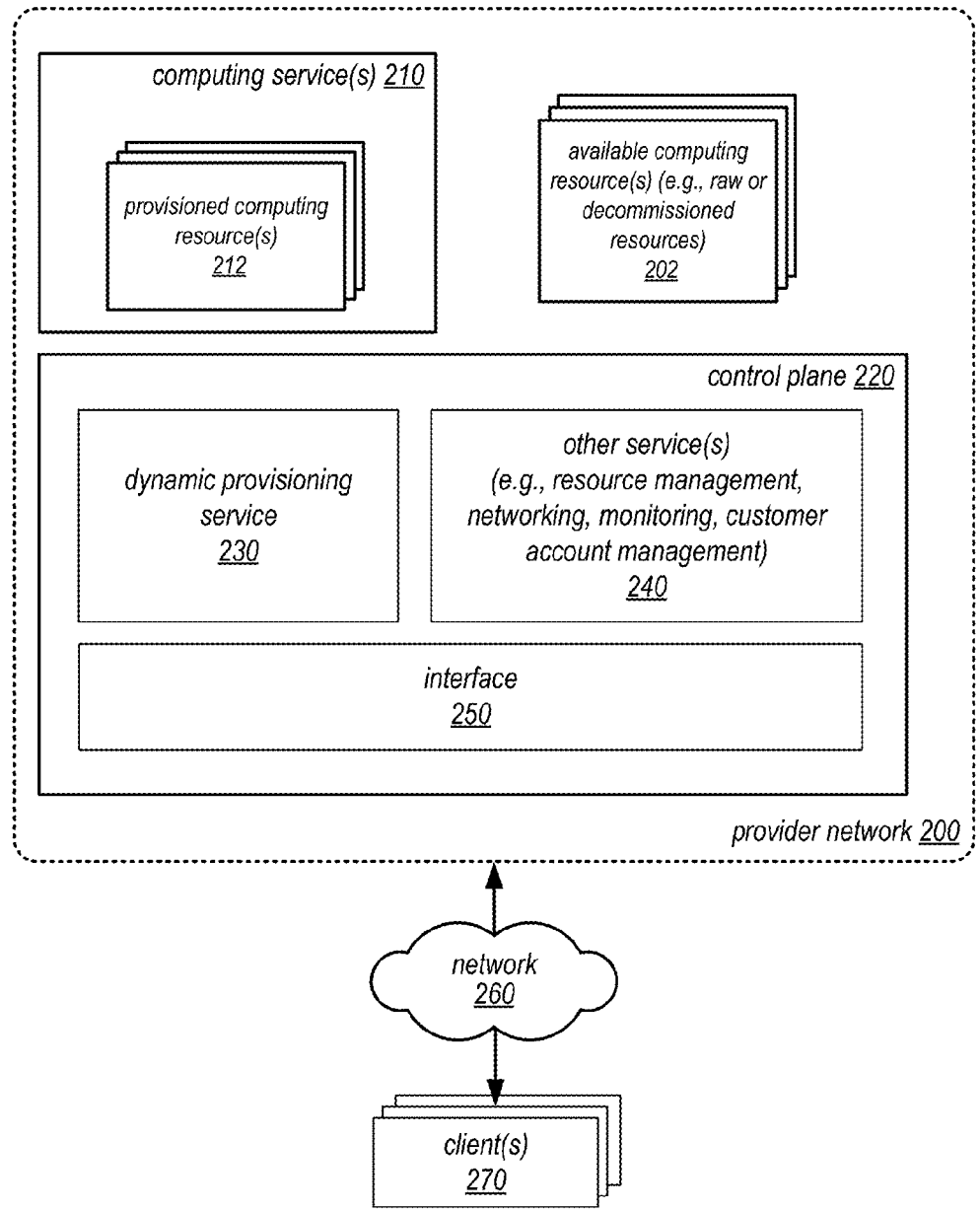
FIG. 2 is a block diagram illustrating dynamic provisioning of computing resources for a provider network, according to some embodiments.

FIG. 2 is a block diagram illustrating dynamic provisioning of computing resources for a provider network, according to some embodiments. The various components of a provider network illustrated may be implemented on one or more computing devices, such as computing system 2000 in FIG. 11, in one or more hardware and/or software components. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200.

In some embodiments, provider network 200 may provide computing resources as part of computing service(s) 210. For example, these computing resources may in some embodiments be offered to clients in units called "instances." A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of provider network 200 in different embodiments, including general purpose or special purpose computer servers, storage devices, network devices and the like. Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 270 applications, without for example requiring the client 270 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Provider network 200 may implement control plane 220 to manage the operation of provider network 200 and computing service(s) 210. Other service(s) 240 may implement various functionalities, such as resource management, network management, monitoring, and customer account management. Control plane 220 may also implement interface 250, which may be a programmatic and/or graphical user interface for client(s) 270 to access computing service(s) 210 and other features provided by control plane 220 (e.g., account control features).

Computing services, like computing service(s) 210, may be implemented utilizing computing resource(s) 212 that have been provisioned to perform various tasks as part of the respective computing service. For example, provisioned computing resource(s) 212 may host one or more of the variously configured instances described above. In some embodiments, in order to increase or add additional capacity to computing service 210 to handle more clients, additional computing resources may be needed. Moreover, different configurations of the computing resources may be needed. In various embodiments, provider network 200 may implement dynamic provisioning service 230 as part of control plane 220 to provision available computing resources 202 (which may be newly acquired resources or decommissioned resources) to support computing services 210.

Clients 270 may encompass any type of client configurable to submit requests to provider network 200. For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of compute instances or other services offered by computing service(s) 210 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 270 may be configured to generate network-based services requests according to a Representational State Transfer (REST)-style network-based services architecture, a document- or message-based network-based services architecture, or another suitable network-based services architecture. In some embodiments, a client 270 (e.g., a computational client) may be configured to provide access to a compute instance 270 in a manner that is transparent to applications implement on the client 270 utilizing computational resources provided by the compute instance.

Clients 270 may convey network-based services requests to provider network 200 via external network 260. In various embodiments, external network 260 may encompass any suitable combination of networking hardware and protocols necessary to establish network-based communications between clients 270 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
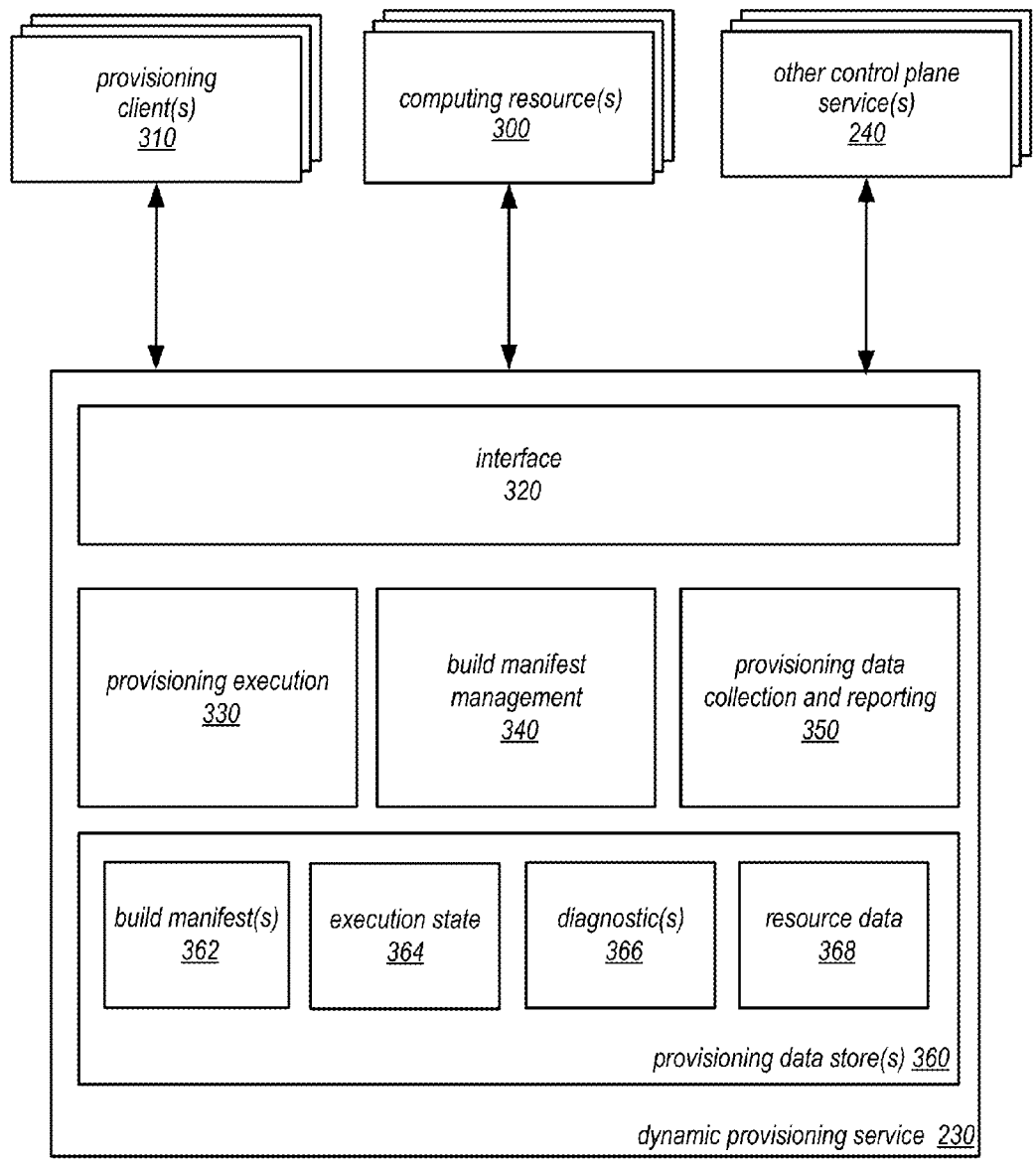
FIG. 3 is a block diagram illustrating a dynamic provisioning service, according to some embodiments.

FIG. 3 is a block diagram illustrating a dynamic provisioning service, according to some embodiments. As noted above with regard to FIG. 2, the various components of dynamic provisioning service illustrated may be implemented on one or more computing devices, such as computing system 2000 in FIG. 11, in one or more hardware and/or software components. In various embodiments, dynamic provisioning service 230 may be highly scalable—able to handle extremely large workloads. For example, some or all of the various components discussed below may be implemented across multiple different nodes, systems and/or devices. However, in some embodiments, the described functionalities may be scalable to fit into a single computing device (e.g., a single server box or node with local attached storage). In this way, dynamic provisioning service 230 may accommodate data centers, collection of computing resources, or provider networks of any size—from a virtualized collection of resources running on a developer workstation, or a small environment consisting of two racks in the back of a truck, to multiple interconnected data centers.

Dynamic provisioning service 230 may implement interface 320, which may be a programmatic (e.g., an application programming interface (API)) and/or graphical user interface via which other systems or devices, such as provisioning clients 310, computing resources 300, and other control plane services 240 may communicate with dynamic provisioning service. For example provisioning client(s) 310, which may be like clients 270, and may be internal or external to provider network 200, may upload, generate, update, delete or otherwise interact with build manifests that are used to provision computing resources. Similarly, these provisioning clients 310 (or other control plane services 240) may be provided with diagnostics and other data about ongoing provisioning operations (e.g., live data streams) or query previously collected historical data. In some embodiments, provisioning client(s) 310 may be able send requests to provoke dynamic provisioning service 230 to re-provision idle or unused computing resources. Interface 320 may provide support for developing operations tooling that may be implemented at provisioning client(s) 310. Interface 320 may also be configured to allow components of dynamic provisioning service 230 to interact with other control plane service(s) 240 according to their respective interfaces (e.g., to perform various configuration and/or provisioning tasks).

Dynamic provisioning service 230 may implement provisioning execution 330 (discussed in detail below with regard to FIG. 5) to direct computing resources, such as computing resources 300 to perform configuration operations according to build manifests. Dynamic provisioning service 230 may implement build manifest management 340 (as discussed in detail below with regard to FIG. 7) to create and manage build manifests for provisioning computing resources to perform respective tasks.

Dynamic provisioning service 230 may implement provisioning data collection and reporting 350. Provisioning data collection and reporting 350 may provide deep support for access to diagnostic artifacts. For example, provisioning data store(s) 360 may maintain diagnostic(s) 366 collected during the course of provisioning computing resources. Access to these historical diagnostic(s) 366 may be made available via provisioning data collection and reporting 350 (e.g., servicing various data queries and requests). In some embodiments provisioning data collection and reporting 350 may provide access to live diagnostic data streams—allowing operators (e.g., client(s) 310) and services (e.g., services 240) to consume live, telemetric diagnostic information from systems inside the provisioning service 230. Provisioning data collection and reporting 350 may provide a framework for components of computing resources 300 to report diagnostics during configuration operations. For example, operating system components installed or loaded onto computing resources when performing configuration operations may include "active logging" components, which allow logging and diagnostic operations to be exposed into the dynamic provisioning service 230. For example, when an operating system is instrumented with this active logging framework, all of the system logs and other relevant information may be automatically published into dynamic provisioning service 230, allowing for deep inspection via queries and other interface requests, and also for live consumption during the provisioning act. Provisioning data collection and reporting 350 may also provide metrics from the provisioning pipeline, allowing for automated intelligent pipeline optimization, and also allowing for full operational alarming.

Dynamic provisioning service 230 may implement provisioning data store(s) 360 to provide persistent storage for various data including, but not limited, to build manifests(s) 362, execution state 364, diagnostic(s) 366, and other resource data 368. For example, provisioning data store(s) 360 may implement an extensive inventory management database for maintaining information about provisioned, available, and/or raw computing resources. Various lifecycle management schemes for provisioning and decommissioning computing resources may be managed according to such an inventory management database. Provisioning data store(s) 360 may utilize local storage, such as a local database, storage cluster, or type of data store, or may utilize a storage service of provider network 200, in some embodiments.

Figure 4:
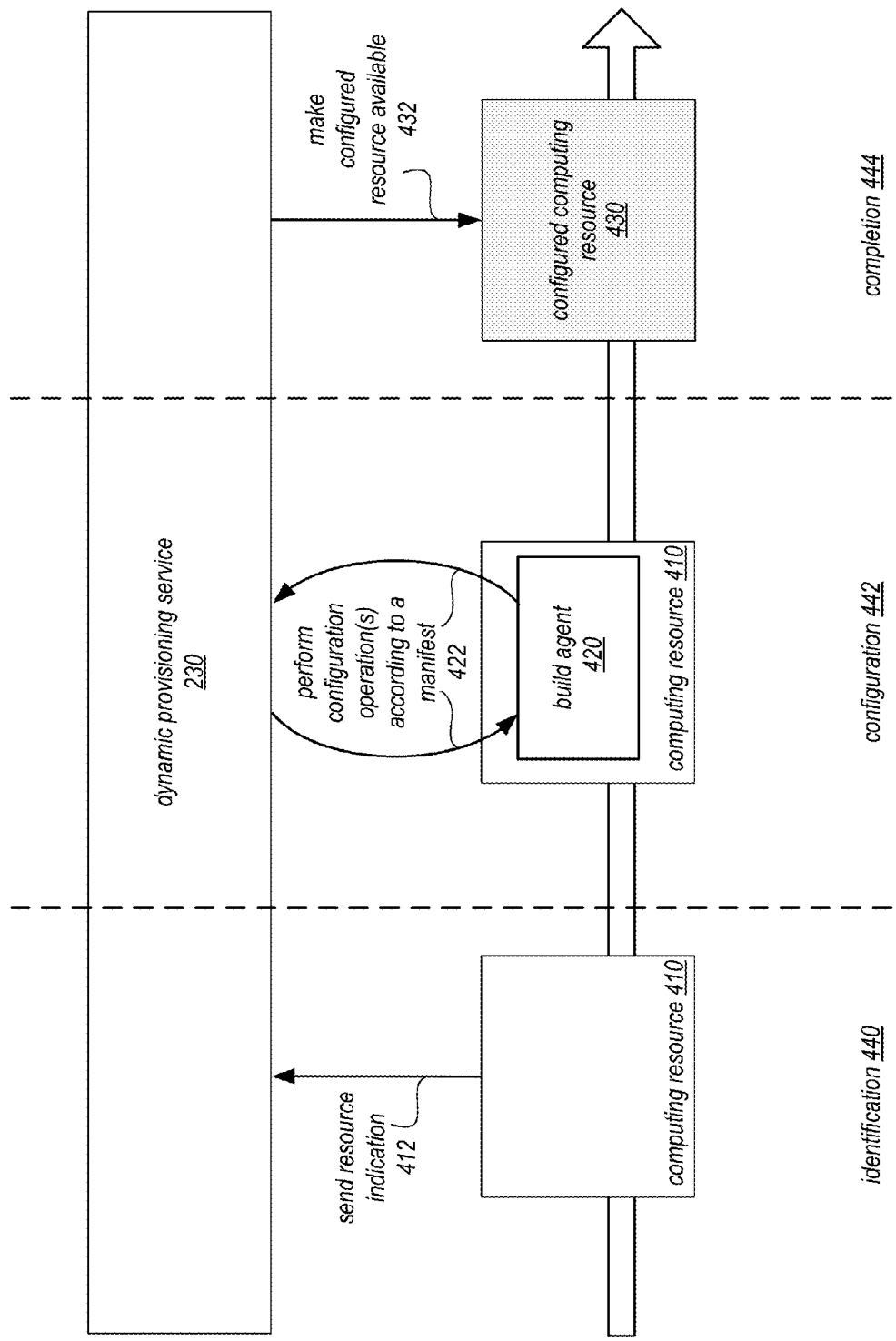
FIG. 4 is a block diagram illustrating interactions between a computing resource and a dynamic provisioning service, according to some embodiments.

Dynamic provisioning of computing resources may occur in three phases, in some embodiments. Different interactions may occur during the different phases between a computing resource and dynamic provisioning service 230. FIG. 4 is a block diagram illustrating interactions between a computing resource and a dynamic provisioning service, according to some embodiments.

Identification phase 440 illustrates that computing resource 410 may send an indication of itself to dynamic provisioning service 230. For example, computing resource 410 may be configured to attempt to boot over a network from dynamic provisioning service 230 (e.g., according to a Preboot Execution Environment implemented on a computing resource (PXE)). In some embodiments, multiple interactions, such as discussed below with regard to an identification workflow may be performed to identify or detect computing resource 410. In configuration phase 442, dynamic provisioning service begins directing computing resource 410 to perform configuration operations 422 according to a build manifest that has been identified for computing resource 410. For example, in some embodiments, computing resource 410 may be instructed load or launch build agent 420 (e.g., by obtaining/loading a ram disk or other application over the network onto the computing resource). Build agent 420 may be an application, module, component, or framework which may allow dynamic provisioning service to direct the performance of configuration operations according to data maintained in a build manifest at dynamic provisioning service 230 (or other remote dynamic provisioning engine). For example, build agent 420 may implement various inversion of control components to obtain the implementation of and/or data to perform various configuration operations from dynamic provisioning service 230 (e.g., request and consume data obtained from the build manifest). For instance, dynamic provisioning service 230 may programmatically instruct build agent 420 to perform certain configuration operations according to the description of the build manifest (as discussed in more detail below with regard to FIG. 9) via such inversion of control components.

Completion phase 444 illustrates the completion of provisioning computing resource 410 as configured computing resource 430. In some embodiments, dynamic provisioning service may instruct 432 resource 430 to advertise itself as ready to perform respective tasks. However, in some embodiments, configured computing resource 430 may perform such an action without the instruction from dynamic provisioning service 230 (e.g., due to a boot procedure, operating system or application installed at configured computing resource 430 as a result of the configuration operations).

Figure 5:
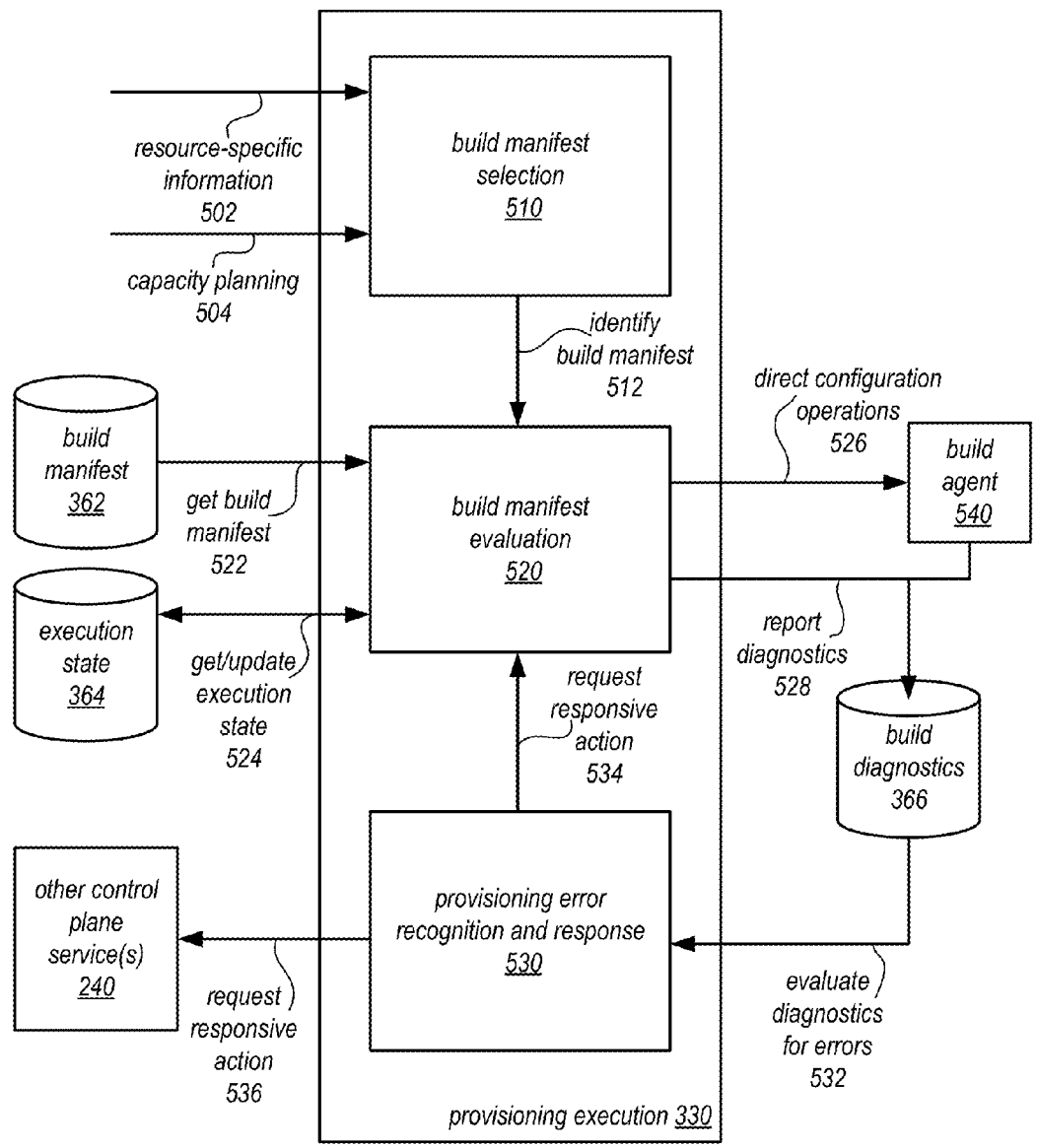
FIG. 5 is a block diagram illustrating provisioning execution, according to some embodiments.

FIG. 5 is a block diagram illustrating provisioning execution, according to some embodiments. Provisioning execution 330 may detect or receive an indication of computing resources to provision, and prepare the computing resource for provisioning. For example, in some embodiments, once new computing resources are powered on, the new computing resources may attempt to (PXE) boot off a network, to bootstrap into the provider network, data center, or other collection of computing devices. Provisioning execution 330 may provide different bootstrap states or workflows which may place a computing resource in a state to begin provisioning. For example, if provisioning execution 330 cannot determine a build manifest to select for provisioning (as discussed below), then an identification bootstrap workflow may be initiated to identify a computing resource. For example, the identification workflow may boot the system into a ram disk, which does a deeper inspection of the system and returns information to dynamic provisioning service 230 to make a build manifest selection. In some embodiments, dynamic provisioning service 230 may support special cases, where new computing resources are not provisioned, but directed to boot from a particular system image.

As illustrated in FIG. 5, provisioning execution 330 may implement build manifest selection 510 to select or identify a build manifest for a computing resource for provisioning. Resource specific information 502 (e.g., such as information received from the computing resource or from other systems) may be used to identify the build manifest. In some embodiments, capacity planning 504, such as input from another control plane service 240, may be used to select a build manifest. Identifying a build manifest may be performed by analyzing one or more selection criteria for the computing resource. Selection criteria may be the information about the computing resource(s) 502, such as hardware specifications for the computing resources (e.g., processor speed, memory amount, storage capacity, etc.), resource supplied information (e.g., identifying information), physical implementation of the computing resource (e.g., region, data center, fault tolerant zone, rack) or other information regarding the computing resource, and/or the capacity planning input 504. In at least some embodiments, the selection criteria may be weighted to allow operators or other control plane components the ability to tune the selection of build manifests.

In the event that a build manifest is not identified for a computing resource, manifest, the computing resource may be placed into a workflow to be provisioned as storage or additional capacity to perform provisioning tasks (e.g., task workers). In some embodiments, a notification or other message or indication may be sent requesting the manual selection or upload of a build manifest.

Once the build manifest is identified 512, a computing resource may be ready for active provisioning (as illustrated in the configuration phase 442 in FIG. 4). In some embodiments, a job or other indication may be placed on a queue such that one or more workers nodes, processes, or other components of provisioning execution 330 may initiate provisioning. As illustrated in FIG. 5, build manifest evaluation 520 may be implemented to evaluate and direct the provisioning of a computing resource. In some embodiments, individual worker nodes, processes, or threads may respectively implement build manifest evaluation 520 so that multiple computing resources may be provisioned in parallel. Build manifest evaluation may get the identified build manifest 522 from build manifest store 362, and begin evaluation of the build manifest. For example, as discussed below with regard to FIG. 9, a configuration operation in the build manifest may be selected. Execution state may be retrieved 524 from execution state store 364 and build agent 540 may be directed to perform the configuration operation 526 based on the execution state retrieved.

As illustrated in FIG. 5, build agent 540 and build manifest evaluation 520 may collect and report diagnostics, which may be stored in build diagnostics store 366. Provisioning execution may implement provisioning error recognition and response 530, which may access and evaluate the diagnostics for errors 532 and responsive actions to be performed, such as discussed below with regard to FIG. 10. For example, provisioning error recognition and response may request a responsive action by other control plane service(s) 240 (e.g., to correct a failure or problem in a system on which the provisioning of a computing resource may depend). Provisioning error recognition and response may also request that build manifest evaluation take a responsive action 534 (e.g., by pausing or undoing provisioning for a computing resource—which may or may not be a resource with a detected build error).

Figure 6:
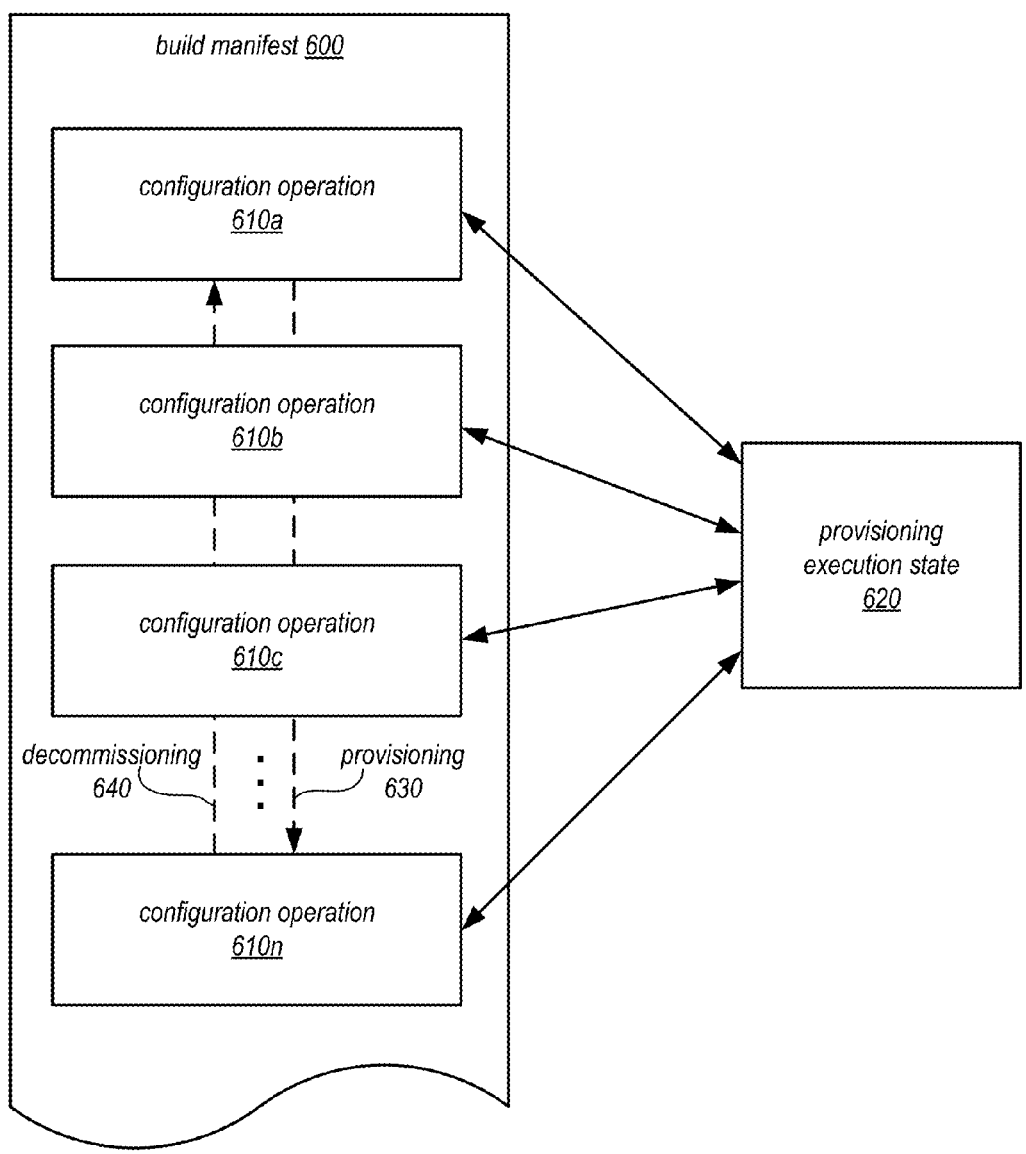
FIG. 6 is a block diagram illustrating a build manifest, according to some embodiments.

FIG. 6 is a block diagram illustrating a build manifest, according to some embodiments. A build manifest may generally describe the one or more configuration operations to be performed in order to configure a computing resource to perform respective tasks. Moreover, the manifest may provide a comprehensive description of the computing resource upon completion of provisioning. Configuration operations may be used to configure various aspects of a computing resource, including, but not limited to kernel and system images at specific versions, software packages at specific versions, software repository selections at specific versions, storage configuration at specific versions, strategy or other instructions for resource allocation at specific versions, resource configurations at specific versions, and/or validation and test configuration at specific versions. For example, configuration operations may be configured to ready a computing resource to provide capacity to host compute instances of the network-based service described above. Configuration operation 610a may, for instance, instruct that particular diagnostic operations be performed at the computing resource, while configuration operation 610b may direct that a particular version of an operating system be downloaded from a particular location (e.g., a software repository) and installed on a particular storage device of the computing resource.

In various embodiments, build manifests, such as build manifest 600, may represent a description of configuration operations that produce the same capacity, in the same way, each time the build manifest is executed. In other words, the manifest may be a point-in-time snapshot of a provisioning operation, which may be concrete and repeatable. Build manifests may describe a particular order or sequence for performing configuration operations. Advancing through each configuration operation 610 may allow a provisioning engine to provision 630 for performing respective tasks. However, build manifests may also include undo operations or version of configuration operations 610, which may allow the different configuration operations to be partially or fully undone. For example, retreating back through configuration operations 610, undoing each configuration operation 610 in reverse order may be performed to decommission 640 a computing resource. Build manifests may also include retry policies and other information for handling unsuccessful attempts to perform a configuration operation, in some embodiments.

Configuration operations 610 may be idempotent and orthogonal. However, as illustrated in FIG. 6, configuration operations may be informed by provisioning execution state maintained for a computing resource. For example a database or other persistent store may be used, in some embodiments, to maintain state information, parameters, variables and other data that informs the performance of a configuration operation. Configuration operations may result in access to provisioning execution state, reading and writing new information (which have been generated as a result of performing the configuration operation). Configuration operations may be transactional, in some embodiments, such that the tasks, actions, or changes, to data or computing resource contained in a configuration operation can succeed or fail as a unit.

Figure 7:
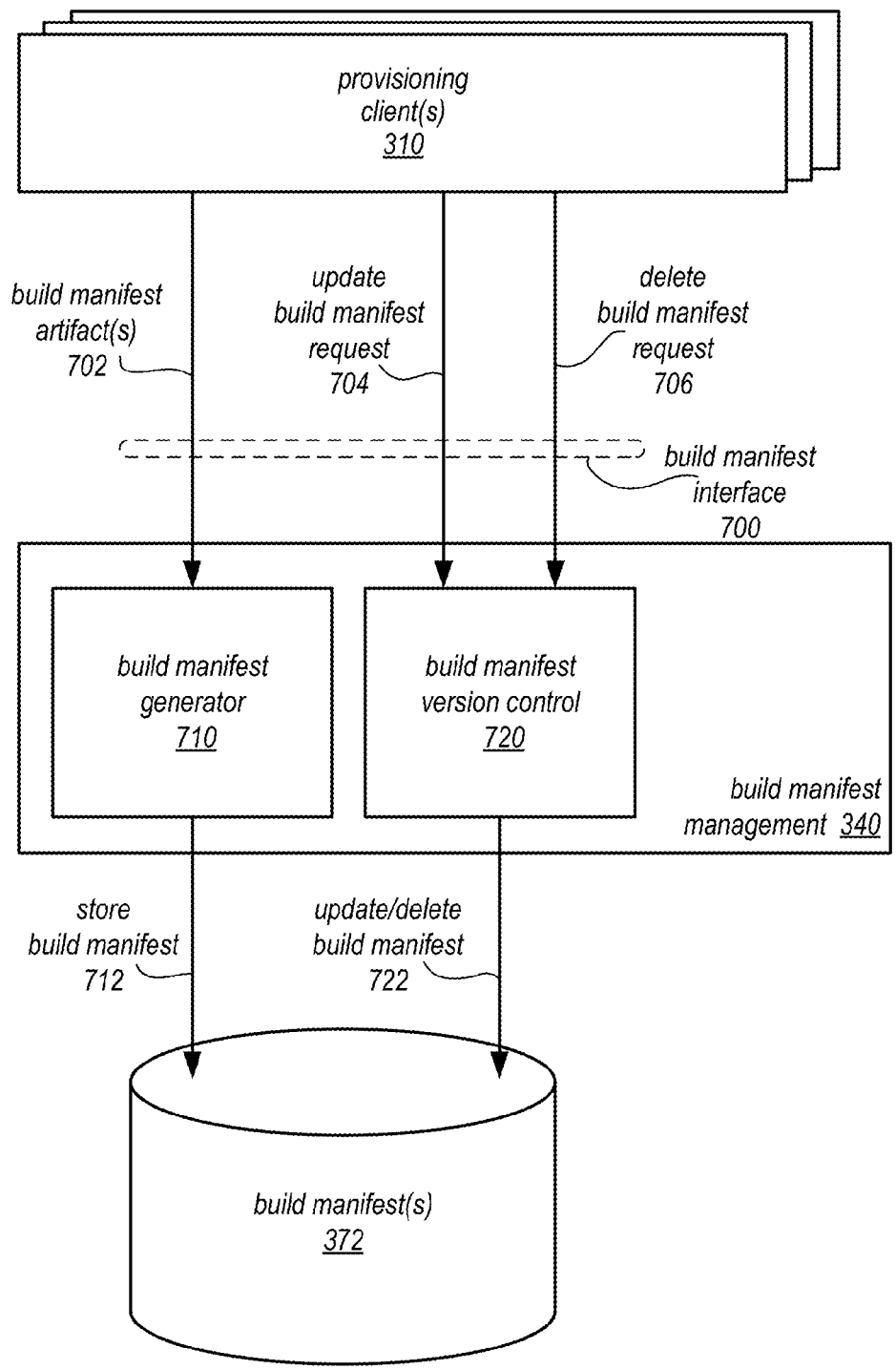
FIG. 7 is a block diagram illustrating build manifest management, according to some embodiments.

FIG. 7 is a block diagram illustrating build manifest management, according to some embodiments. As noted earlier, build manifests may be created, generated, uploaded, updated, or deleted. As illustrated in FIG. 7, provisioning client(s) 310 (or other systems or devices) may communicate with build manifest management 340 via build manifest interface 700. Build manifest interface 700 may be programmatic (e.g., supporting API calls from a command line interface or other application) and/or a graphical user interface. In various embodiments, build manifest interface 700 may be implemented as part of interface 320 for dynamic provisioning service 230, in some embodiments.

In at least some embodiments, build manifest management 340 may implement build manifest generator 710. Build manifest generator 710 may take one or more build manifest artifacts, which may be settings, configurations, identifiers, or other information describing the desired resultant configuration of a computing resource and generate a build manifest including the configuration operations to achieve the desired configuration. For large distributed systems, such as provider networks offering multiple network-based services, many stakeholders may be involved in the generation of build manifests. As illustrated in FIG. 7, provisioning client(s) 310 operated by the different stakeholders may submit build artifact(s) 702 (or inputs/requests which lead to the creation of build artifact(s)) via interface 700 to build manifest generator 710. Once generated, build manifest generator 710 may store the generated build manifest 712 in a data store for build manifests 372.

Build manifest management 340 may implement build manifest version control 720, in some embodiments, to manage stored build manifests. For instance, in addition generating build manifests, requests to update build manifests 704 may be sent from clients 310 via interface 700. For example, a request may be sent to update one or more configuration operations of a build manifest. As a result of this request build manifest version control 720 may generate (or instigate the generation of) a new version of the build manifest including the updated configuration operations. Build manifest version control 720 may update 722 build manifest(s) store 372 to include the new version of the manifest. Build manifest version control 720 may also receive requests to delete manifests 706 via interface 700. Correspondingly, build manifest version control 720 may delete the identified build manifests 722 from build manifest(s) store 372 (or mark them as unavailable for subsequent use for provisioning).

Figure 8:
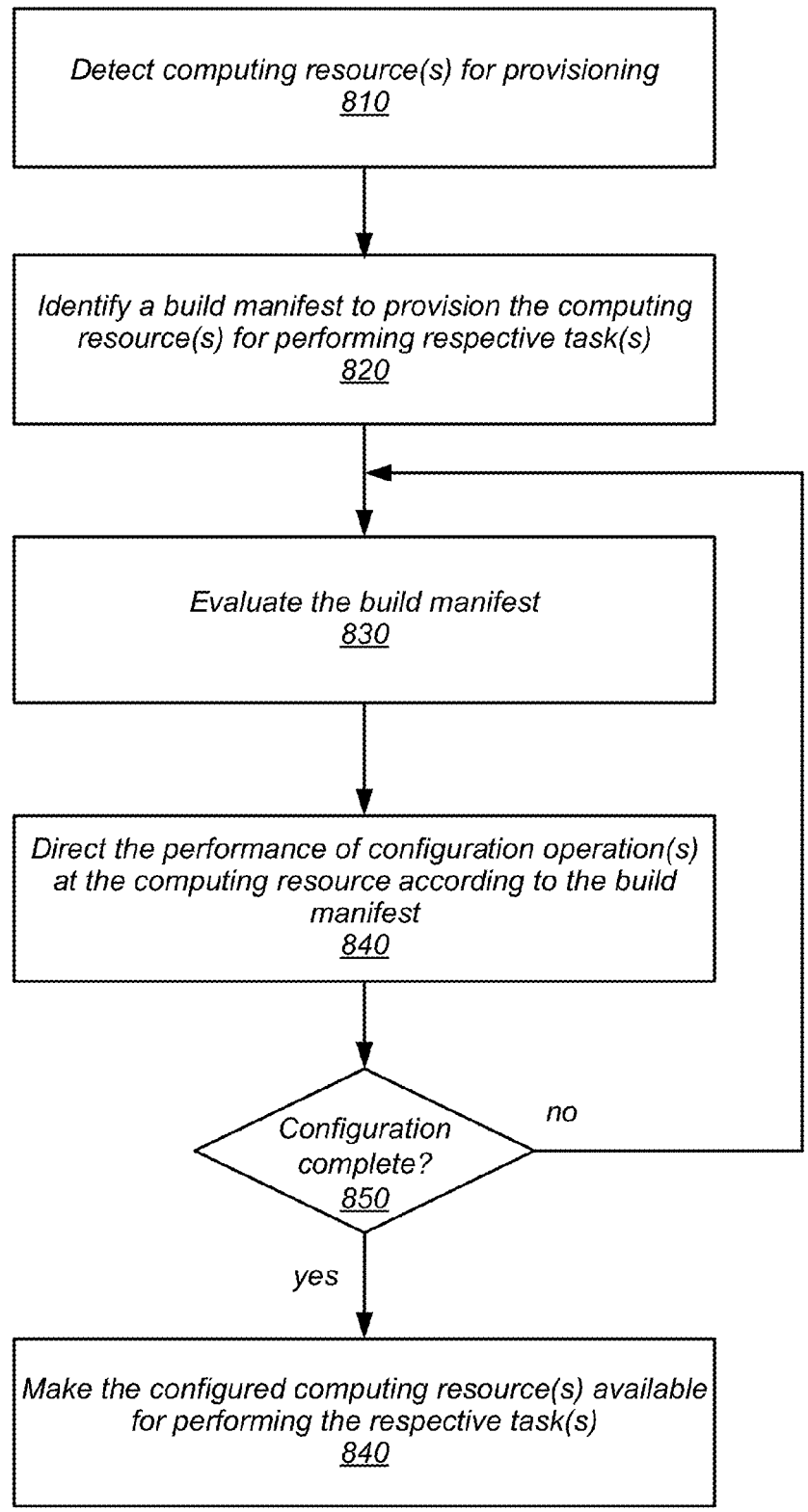
FIG. 8 is high-level flowchart illustrating various methods and techniques for dynamic provisioning of computing resources, according to some embodiments.

The examples of implementing dynamic provisioning of computing resources discussed above with regard to FIGS. 2 through 7 have been given in regard to virtual computing resources offered by a provider network. Various other types or configurations of systems or services may implement these techniques. For example, in some embodiments, a provisioning engine and/or service may be implemented in a single computing device to provision computing resources. Moreover, the tasks, location, or environment for which computing resources are provisioned (e.g., rack, room, data center, fault tolerance zone) may vary. FIG. 8 is high-level flowchart illustrating various methods and techniques for dynamic provisioning of computing resources, according to some embodiments. These techniques may be implemented using various components or nodes of a system as described above, or other systems or devices.

As indicated at 810, computing resource(s) for provisioning may be detected, in some embodiments. For example, when a new computing resource is added to a network in a data center or other collection of network computing devices, the computing resources may send an indication identifying itself to a provisioning engine or service which may detect the computing resource based on the indication. In another example, as new computing resources are added, information indicating the new computing resources may be entered into a database or other system that maintains information about computing resources in a data center or collection of computing resources. The database may be periodically queried or scanned for new entries to detect new computing resources for provisioning.

As indicated at 820, a build manifest may be identified to provision the computing resource(s) for performing respective task(s). A default build manifest may be selected in some embodiments. In some embodiments, a specific build manifest may identified or indicated in information provided to a provisioning engine. However, as discussed above, multiple build manifests may be maintained for provisioning a system to perform different respective tasks, in some embodiments. For example, the computing resources may be provisioned to add additional capacity to serve more clients of a network-based service, such as the computing services discussed above with regard to FIG. 2. In another example, the computing resources may be provisioned to perform tasks or functions for a system that is not yet online or operational. In some embodiments, identifying the build manifest may be based on identifying which tasks the computing resource(s) should perform. For instance, in a system where the computing resource(s) may be provisioned to do different tasks (e.g., for different services, or different components of a system or service), a selection may be made from among the multiple different build manifests.

In at least some embodiments, identifying a build manifest may be performed by analyzing one or more selection criteria for the computing resource(s). As discussed above with regard to FIG. 5, selection criteria may be information about the computing resource(s), such as hardware specifications for the computing resources (e.g., processor speed, memory amount, storage capacity, etc.), resource supplied information (e.g., identifying information), physical implementation of the computing resource (e.g., region, data center, fault tolerant zone, rack) or other information regarding the computing resource. Other input or data, such as need for particular resources to perform tasks (e.g., input from a capacity planning system). In at least some embodiments, the selection criteria may be weighted. Requests to modify weightings of scores may be received to increase the selection of particular build manifests, in some embodiments. For example, if a capacity planning system identifies that resources of a certain configuration are needed to meet the demand of a particular function of a network-based service, then the capacity planning system may request that criteria which determine whether a build manifest that provisions resources to perform the particular function be increased in weight so that computing resources which may be configurable to perform the needed function are provisioned according to the build manifest which results in the desired configuration.

As indicated at 830 and 840, the build manifest may be evaluated and performance of the configuration operations of the identified build manifest at the computing resource(s) may be directed, in some embodiments. As discussed in more detail below with regard to FIG. 9, a build manifest framework or other component, such as build agent 420 discussed above with regard to FIGS. 4 and 5, implemented at the computing resources may be utilized to allow a provisioning engine, system, or service which is remote from the computing resources to programmatically control the performance of configuration operations at the computing resources. Once the configuration is complete, as indicated by the positive exit from 850, the configured computing resources may be made available for performing the respective task(s). For example, the configured computing resources may be identified to a control plane system as available to begin receiving workload.

Figure 9:
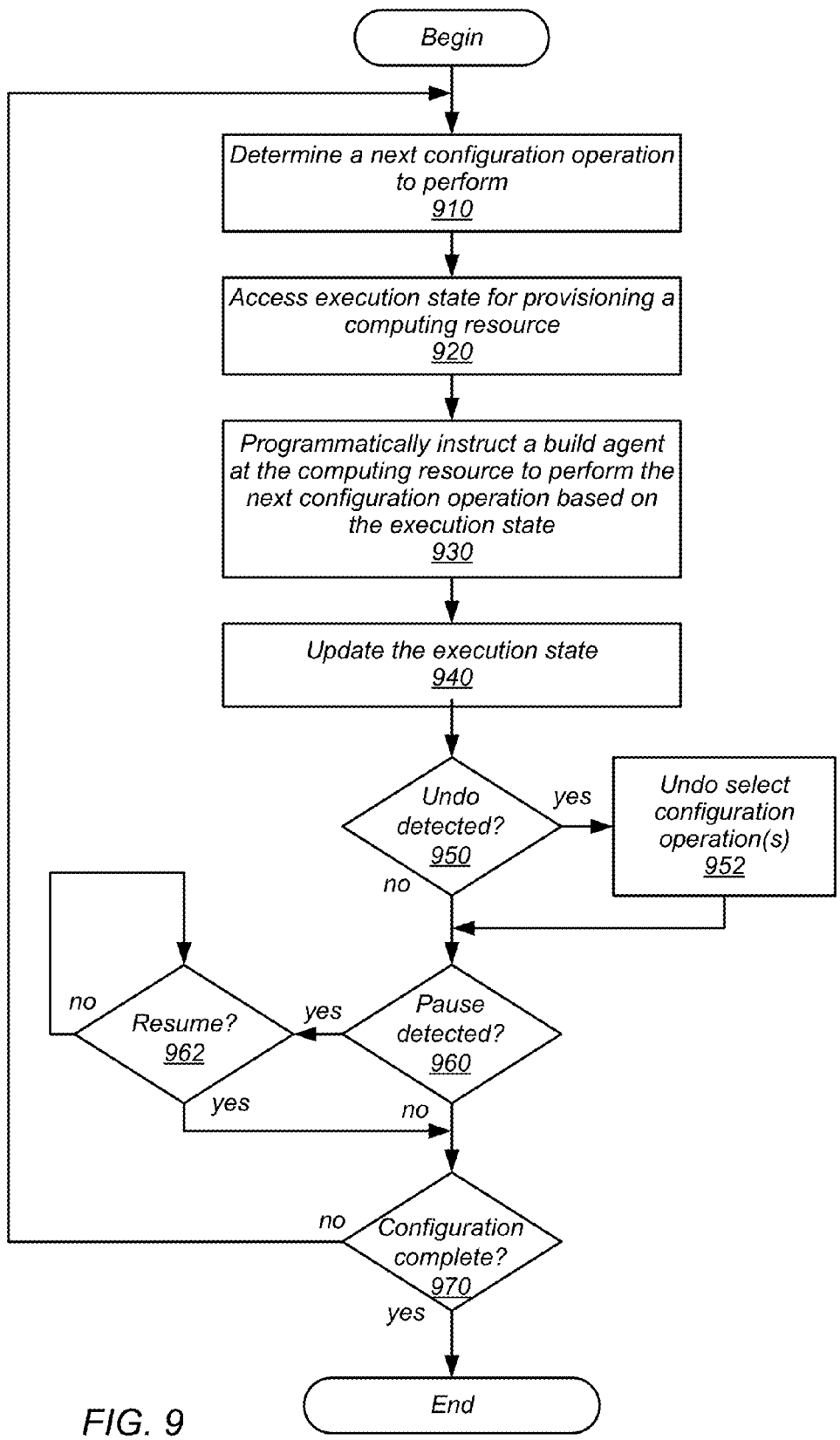
FIG. 9 is a high-level flowchart illustrating various methods and techniques for directing the performance of configuration operations to provision computing resources according to a build manifest, according to some embodiments.

Build manifests may allow a provisioning engine or other system or device implementing the above techniques to drive the provisioning of computing resources for particular tasks, systems, or services, removing the responsibility for decision making and other provisioning tasks from a computing resource itself. The operations described in a build manifest to configure computing resources may be used to allow provisioning to be consistently and repeatable performed for multiple computing resources to be provisioned to perform the same tasks. FIG. 9 is a high-level flowchart illustrating various methods and techniques for directing the performance of configuration operations to provision computing resources according to a build manifest, according to some embodiments.

As indicated at 910, when evaluating a build manifest, a next configuration operation to perform may be determined, in some embodiments. For example, as described above with regard to FIG. 6, a build manifest may describe an ordering or sequence in which configuration operations may be performed. The next configuration operation may be determined according to the ordering or sequence in the build manifest. As indicated at 920, execution state for the provisioning may be accessed, in some embodiments. Execution state, as described above with regard to FIG. 6 may describe common data, parameters, variables, or other information which may be used to perform a determined configuration operation. For example, the results of a previously performed configuration operation (e.g., a particular resource configuration or information obtained) may be used as input to perform the next configuration operation.

As indicated at 930, a build agent at a computing resource may be programmatically instructed to perform the next configuration operation based, at least in part, on the execution state, in some embodiments. For example, as discussed above with regard to FIG. 8, the manifest frame, execution platform, or other implementation located at a computing resource being provisioned (such as a build agent) may be able to receive data that indicates the action(s) to be taken to perform the configuration operation. Inversion of control components or techniques may be implemented at the computing resource, allowing the configuration operation to be programmatically injected into the computing resource (e.g., into a ram disk or other set of instructions performed at the computing resource). As noted above, the execution state may provide input, variables, or other information for performing the next configuration operation which may be provided or included in the instructions to the build agent.

As indicated at 940, the execution state may be updated to reflect the performance of the next configuration operation. For example, results and/or other information may be obtained at the build agent after performing the configuration may be recorded or written to the execution state. Additionally, state information describing completed configuration operations for the provisioning of the computing resource may be updated to indicate the completed next configuration operation. In at least some embodiments, elements 930 and 940 may be performed as a single transaction, which either completes or does not complete. Though a configuration operation may include multiple different tasks or steps to be performed, completed steps or tasks may be rolled back or undone if one of the tasks or steps fails to complete.

Directing the performance of configuration operations in a build manifest may be performed iteratively, as indicated at 970. The next configuration operation may be performed, as illustrated by the negative exit from 970, until all of the configuration operations for a build manifest are performed and configuration is complete, as indicated by the positive exit from 970. Since, the performance of provisioning may be driven by a provisioning engine or other system or device that is remote from the computing resource being provisioned, the provisioning itself may be paused, or fully or partially undone, as discussed above with regard to FIG. 6. In this way, a provisioning engine may manage the state of any resource undergoing provisioning, controlling when a computing resource advances or retreats to a prior state achieved by the performance or undoing of a configuration operation.

For example, as indicated at 950, an undo event for a provisioning may be detected during the iterative performance of configuration operations illustrated in FIG. 9. The undo event may be triggered to partially or fully remove the effects of provisioning a computing resource (e.g., returning the resource to a different configuration). As indicated at 952, select configuration operations may be undone. For example, as discussed above with regard to FIG. 6, a build manifest may describe an undo operations for each configuration operation in a build manifest to reverse the effects of the performance of the configuration operation (e.g., return a storage device to a prior format, relinquish an assigned network address, etc.). The corresponding undo operations may be performed for identified configuration operations, in some embodiments in a manner similar to that illustrated at elements 910 through 940, by programmatically instructing a build agent to perform the undo operations. In this way, provisioning of a computing resource may move forward or backward along a sequence of configuration operations (e.g., in order to troubleshoot at what point a particular problem occurs). In at least some embodiments, a decommissioning event may detected similar to an undo event, which may be similarly handled to perform the undo operations described in a build manifest used to provision a computing resource to return the resource to a raw or decommissioned state, available for provisioning for other tasks (or removal).

A pause event may be detected, as indicated at 960, in at least some embodiments. For instance, the number of provisioning operations ongoing may need to be throttled so as not to overwhelm other control plane systems or dependencies on which the provisioning relies. In some embodiments, as discussed below, an error condition or failure scenario for another computing resource in provisioning may trigger a pause event for other computing resources, to prevent those resources from having the same error occur. A resume event, as indicated at 962, may be detected which allows provisioning to continue. In some embodiments, an undo event may follow a resume event (not illustrated). Please note that FIG. 9 is provided for illustrative purposes and is not intended to be limiting as to the particular ordering of elements depicted.

Figure 10:
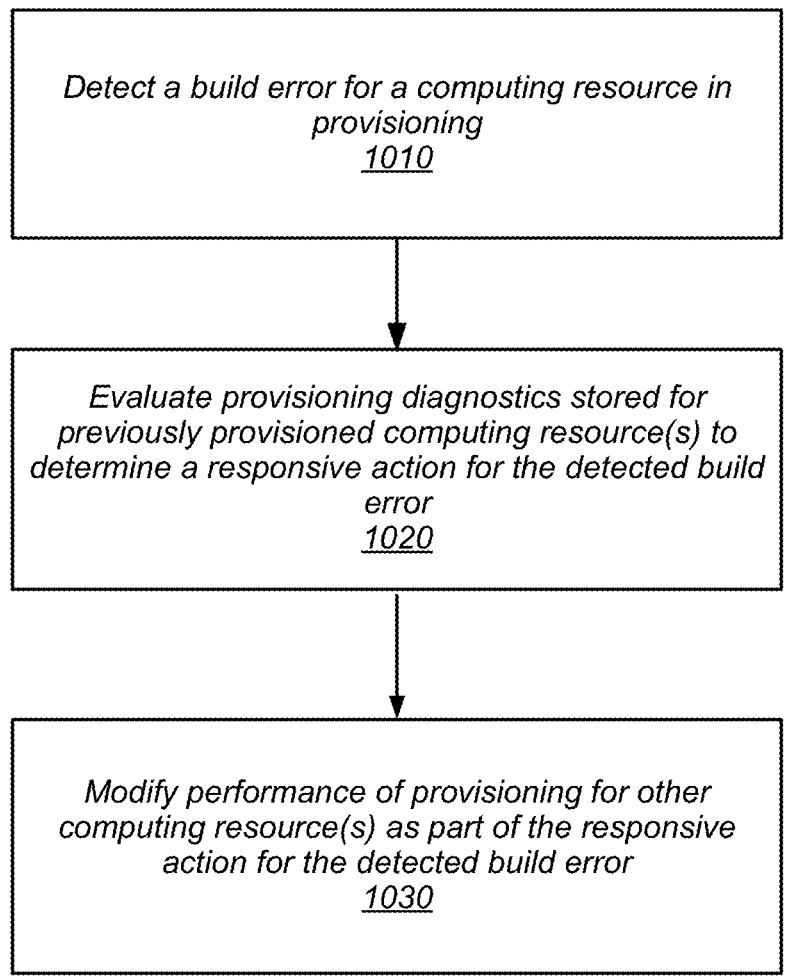
FIG. 10 is a high-level flowchart illustrating various methods and techniques for performing responsive actions to build errors detected in provisioning computing resources, according to some embodiments.

Diagnostic information, provisioning performance metrics, and other information, as noted earlier may be collected during the performance of provisioning for various computing resources. In addition to providing the diagnostic information to provisioning clients, or other systems or devices, the diagnostics may be stored and evaluated using machine learning, or other data analysis techniques, to identify problems that occur during provisioning and appropriate corrective responses or other improvements that may be performed or implemented. For example, in some embodiments responsive actions, such as repairing certain failure conditions, may be automatically or dynamically detected and performed. FIG. 10 is a high-level flowchart illustrating various methods and techniques for performing responsive actions to build errors detected in provisioning computing resources, according to some embodiments.

As indicated at 1010, a build error for a computing resource in provisioning may be detected. For instance, a configuration operation performed at a host may be unable to complete due to some failing dependency. Consider the example of a network address allocation system, which may be separate from a provisioning engine or other entity implementing the aforementioned techniques, may have no more network addresses allocated to assign to computing resources currently being provisioned. The configuration operation performed as described in a build manifest may programmatically instruct a build agent at a computing resource to obtain a network address from the network address allocation system. The configuration operation may return a build error, as no more network addresses are available.

Provisioning diagnostics may be evaluated to determine a responsive action for the detected build error, as indicated at 1020, in some embodiments. For example, diagnostics information for previous instances of provisioning may be analyzed to identify particular error codes, behaviors, or other signifiers that may determinatively point to what the detected error is. In the example given above, it may be that all failures that occur at a common configuration operation in the particular build manifest being used to provision the computing resources occur as a result of a lack of network addresses available to allocate to a computing resource. The diagnostic information may also describe responsive actions taken to correct or alleviate the detected build error. For example, particular API calls, requests, or other actions taken to initiate the allocation of additional network addresses at the network address allocation system may be performed. In some embodiments, the responsive action for the detected build error may be to flag or identify the computing resource for manual evaluation by a technician or engineer (e.g., by sending a notification or posting to a maintenance reporting system). Many different machine learning, data mining, or other analysis techniques may be implemented to determine the build error and responsive action, and thus the previous examples is not intended to be limiting.

In at least some embodiments, as indicated at 1030, the performance of provisioning other computing resource(s) may be modified as part of the responsive action for the detected build error. As in the given example, other computing resources being provisioned using the same build manifest (or another build manifest that includes a configuration operation with a similar dependency on the network address allocation system) may be identified. A pause event, such as discussed above with regard to FIG. 9, may be triggered, to pause the performance of the provisioning until more network addresses have been allocated. In another example, undo operations may be performed at other computing resources to return the computing resources to a prior configuration. As noted above, other responsive actions, whether performing other automated responses or fixes, or notifying technicians or engineers of the affected computing resources may be performed. In at least some embodiments, the configuration operations of a common or similar build manifest that would result in the build error may be undone (such as described above with regard to FIG. 9) and a different build manifest (which may have configuration operations that do not result in the build error) may be used to provision the computing resources. In this way, build errors may be dynamically handled or predicated, without each computing resource affected by a common dependency having to trigger the same build error and initiate the same responsive actions.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 11:
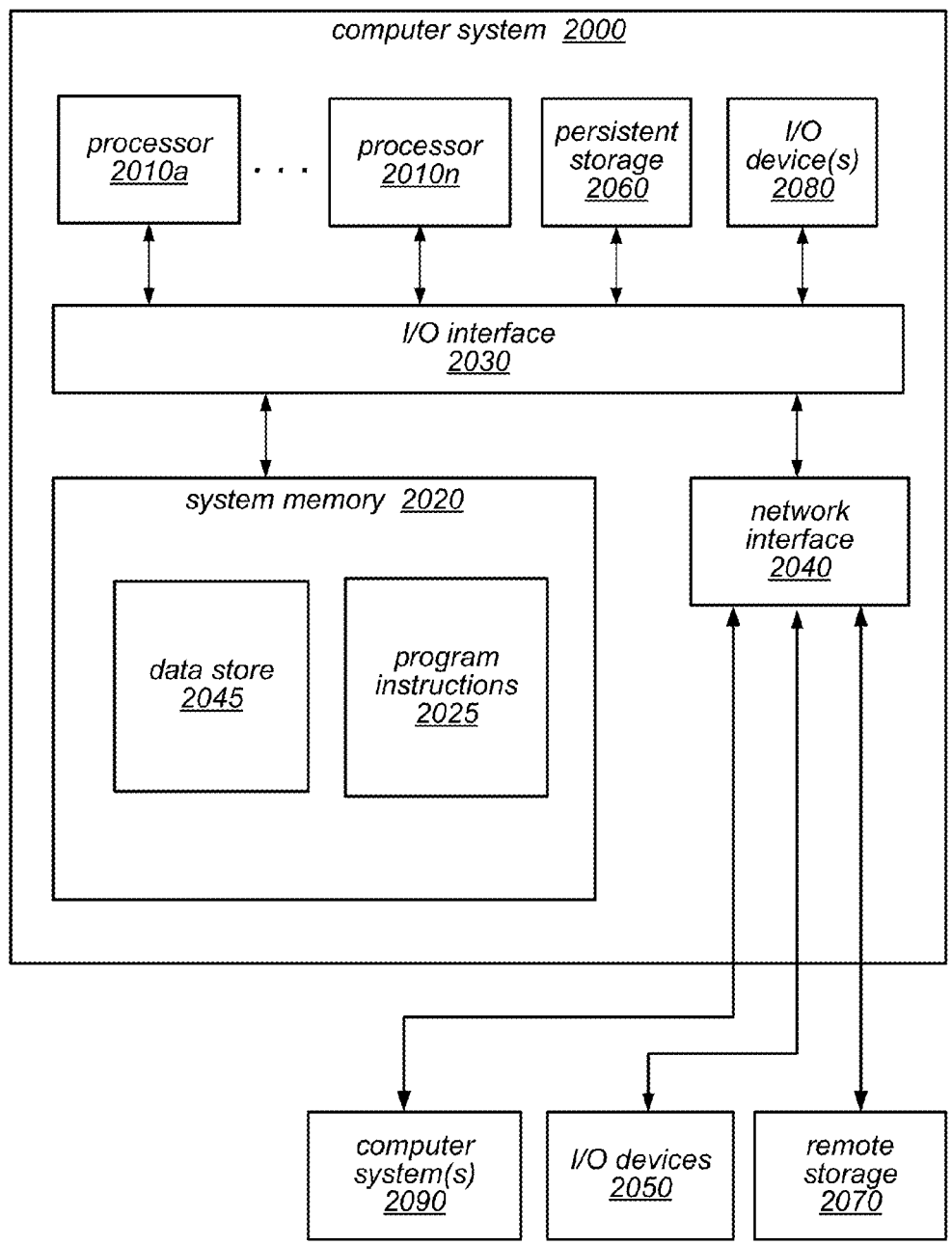
FIG. 11 is a block diagram illustrating an example computing system, according to some embodiments.

Embodiments of dynamic provisioning of computing resources as described herein may be executed on one or more computer systems, which may interact with various other devices. FIG. 11 is a block diagram illustrating an example computer system, according to various embodiments. For example, computer system 2000 may be configured to implement one or more nodes of a compute cluster that implements the provisioning engine or service described above, the network-based services, such as a computing service or storage service, and/or clients or other systems or devices described above, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the data warehouse system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a virtual computing resource provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor;
   a system memory comprising program instructions, wherein the program instruction when executed by the at least one processor cause the at least one processor to implement a provisioning engine;
   the provisioning engine, configured to:
      detect that one or more computing resources are available for provisioning;
      evaluate the detected one or more computing resources to select a build manifest to provision the one or more computing resources for performing one or more respective tasks, wherein the build manifest comprises one or more operations to configure computing resources for performing the one or more respective tasks;
      direct the one or more computing resources to perform the one or more operations according to an evaluation of the build manifest in order to configure the one or more computing resources; and
      upon completion of the one or more operations, make the one or more configured computing resources available for performing the one or more respective tasks.

2. The system of claim 1, wherein the build manifest is one of a plurality of different build manifests for performing different respective tasks, and wherein to evaluate the detected one or more computing resources to select the build manifest, the provisioning engine is configured to:
   analyze one or more selection criteria for the one or more computing resources with respect to the plurality of different build manifests in order to select the build manifest.

3. The system of claim 1, wherein to direct the one or more computing resources to perform the one or more operations according to the evaluation of the build manifest, the provisioning engine is configured to:
   for the one or more configuration operations:
      determine a next configuration operation of the one or more configuration operations to perform according to the build manifest;
      access execution state maintained for the provisioning of the one or more computing resources; and
      programmatically instruct a build agent hosted at the one or more computing resources to perform the next configuration operation based, at least in part, on the execution state.

4. The system of claim 1, wherein the provisioning engine is implemented as part of a control plane for a data center, and wherein the one or more computing resources are additional computing resources added to a larger collection of computing resources implemented as part of the data center.

5. A method, comprising:
   performing, by one or more computing devices:
      detecting that one or more computing resources are available for provisioning;
      evaluating the detected one or more computing resources to identify a build manifest to provision the one or more computing resources for performing one or more respective tasks, wherein the build manifest comprises one or more operations to configure computing resources for performing one or more respective tasks;
      directing the one or more computing resources to perform the one or more operations to configure the one or more computing resources according to the identified build manifest; and
      upon completion of the one or more operations, making the configured one or more computing resources available for performing the one or more respective tasks.

6. The method of claim 5, wherein the build manifest is one of a plurality of different build manifests for performing different respective tasks, and wherein evaluating the detected one or more computing resources to identify the build manifest to provision the one or more computing resources for performing the one or more respective tasks comprises:
   analyzing one or more selection criteria for the one or more computing resources with respect to the plurality of different build manifests in order to select the build manifest.

7. The method of claim 6, wherein a weighting for at least one of the one or more selection criteria is determined according to a request to modify the weighting for the at least one selection criteria, and wherein the analyzing of the one or more selection criteria is performed according to respective weightings for the one or more selection criteria including the modified weighting.

8. The method of claim 5, wherein directing the one or more computing resources to perform the one or more operations to configure the one or more computing resources comprises:
   for the one or more configuration operations:
      determining a next configuration operation of the one or more configuration operations to perform according to the build manifest;
      accessing execution state maintained for the provisioning of the one or more computing resources; and
      programmatically instructing a build agent hosted at the one or more computing resources to perform the next configuration operation based, at least in part, on the execution state.

9. The method of claim 5, wherein the detecting, the evaluating, and the directing are performed for another one or more computing resources, and wherein the method further comprises:
   prior to completion of at least one of the one or more operations for the other one or more computing services, detecting a pause event for the provisioning of the other one or more computing resources such that the at least one operation is not performed.

10. The method of claim 5, wherein the detecting, the evaluating, and the directing are performed for another one or more computing resources, wherein the build manifest further comprises respective undo operations for the one or more operations that when performed reverse configuration changes made as a result of the one or more operations, and wherein the method further comprises:
   in response to detecting an undo event for the provisioning of the other one or more computing resources, evaluating the build manifest to direct the other one or more computing resources to perform at least one of the respective undo operations in order to reverse configuration changes for at least one of the one or more operations at the other one or more computing resources.

11. The method of claim 5, wherein the detecting, the evaluating, and the directing are performed for a plurality of different computing resources including the one or more computing resources, and wherein the method further comprises:
- detecting a build error for one of the plurality of different computing resources;
- in response to detecting the build error:
  - evaluating provisioning diagnostics stored for the plurality of different computing resources to determine a responsive action for the detected build error; and
  - performing the responsive action, wherein the response action comprises modifying performance of at least one operation to configure at least another one of the plurality of different computing resources.

12. The method of claim 5, wherein the plurality of computing devices implement a provisioning service as part of a control plane for a provider network, wherein the provider network implements a network-based service, wherein the one or more tasks are performed to implement at least a portion of the network-based service, and wherein the detecting, the evaluating, the directing, and the making are performed for a plurality of different computing resources including the one or more computing resources in order to increase the capacity of the network-based service.

13. The method of claim 5, wherein the plurality of computing devices implement a provisioning service as part of a control plane for a provider network, wherein the provider network implements a plurality of network-based services, wherein the one or more tasks are performed to implement at least a portion of one of the network-based services, and wherein the detecting, the evaluating, the directing, and the making are performed for a plurality of other computing resources according to one of more different build manifests in order to provision the plurality of other computing resources to perform the one or more tasks for different ones of the plurality of network-based services.

14. A non-transitory, computer-readable storage medium, storing program instructions that when executed by one or more computing devices cause the one or more computing devices to implement:
- identifying that one or more computing resources are available for provisioning;
- evaluating the identified one or more computing resources to select a build manifest to provision the one or more computing resources for performing one or more respective tasks, wherein the build manifest comprises one or more operations to configure computing resources for performing the one or more respective tasks;
- directing the one or more computing resources to perform the one or more operations to configure the one or more computing resources according to the selected build manifest; and
- upon completion of the one or more operations, making the configured one or more computing resources available for performing the one or more respective tasks.

15. The non-transitory, computer-readable storage medium of claim 14, wherein the program instructions cause the one or more computing devices to further implement generating the build manifest based, at least in part, on one or more build manifest artifacts.

16. The non-transitory, computer-readable storage medium of claim 14, wherein the build manifest is one of a plurality of different build manifests for performing different respective tasks, and wherein, in evaluating the identified one or more computing resources to select the build manifest to provision the one or more computing resources for performing one or more respective tasks, the program instructions cause the one or more computing devices to implement:
- analyzing one or more selection criteria for the one or more computing resources with respect to the plurality of different build manifests in order to select the build manifest.

17. The non-transitory, computer-readable storage medium of claim 14, wherein, in directing the one or more computing resources to perform the one or more operations to configure the one or more computing resources, the program instructions cause the one or more computing devices to implement:
- for the one or more configuration operations:
  - determining a next configuration operation of the one or more configuration operations to perform according to the build manifest;
  - accessing execution state maintained for the provisioning of the one or more computing resources; and
  - programmatically instructing a build agent hosted at the one or more computing resources to perform the next configuration operation based, at least in part, on the execution state.

18. The non-transitory, computer-readable storage medium of claim 14, wherein the build manifest further comprises respective undo operations for the one or more operations that when performed reverse configuration changes made as a result of the one or more operations, and wherein the program instructions cause the one or more computing devices to further implement:
- identifying the one or more computing resources for decommissioning;
- in response to identifying the one or more computing resources for decommissioning, evaluating the build manifest to direct the one or more computing resources to perform the respective undo operations in order to reverse configuration changes of the one or more operations at the other one or more computing resources in order to decommission the one or more computing resources from performing the one or more respective tasks.

19. The non-transitory, computer-readable storage medium of claim 14, wherein the program instructions cause the one or more computing devices to implement:
- wherein, in directing the one or more computing resources to perform the one or more operations to configure the one or more computing resources, the program instructions cause the one or more computing devices to implement collecting diagnostic data for the one or more computing resources; and
- wherein the program instructions cause the one or more computing devices to implement providing the diagnostic data collected during the provisioning of the one or more computing resources.

20. The non-transitory, computer-readable storage medium of claim 14, wherein the one or more computing devices is a single computing device configured to implement a provisioning engine for computing resources.

* * * * *